(12) United States Patent
Wang et al.

(10) Patent No.: US 8,218,605 B2
(45) Date of Patent: Jul. 10, 2012

(54) PREAMBLE FOR SYNCHRONIZATION

(75) Inventors: Zhaocheng Wang, Stuttgart (DE);
Masahiro Uno, Fellbach (DE)

(73) Assignee: Sony Deutschland GmbH, Berlin (DE)

( * ) Notice: Subject to any disclaimer, the term of this patent is extended or adjusted under 35 U.S.C. 154(b) by 704 days.

(21) Appl. No.: 11/564,607

(22) Filed: Nov. 29, 2006

(65) Prior Publication Data
US 2007/0223567 A1 Sep. 27, 2007

(30) Foreign Application Priority Data

Mar. 23, 2006 (EP) .................................... 06005943

(51) Int. Cl.
*H04B 1/00* (2006.01)
(52) U.S. Cl. ........ 375/150; 386/256; 375/142; 375/149; 702/89; 713/400; 714/E11.067
(58) Field of Classification Search .................. 375/130, 375/142, 150; 708/422
See application file for complete search history.

(56) References Cited

U.S. PATENT DOCUMENTS

| | | | | |
|---|---|---|---|---|
| 5,228,055 A | * | 7/1993 | Uchida et al. | 375/142 |
| 5,825,807 A | * | 10/1998 | Kumar | 375/130 |
| 6,021,421 A | * | 2/2000 | Retter et al. | 708/422 |
| 6,128,331 A | * | 10/2000 | Struhsaker et al. | 375/142 |
| 6,363,107 B1 | * | 3/2002 | Scott | 375/150 |
| 6,873,664 B1 | | 3/2005 | Clark | |
| 6,959,030 B1 | | 10/2005 | Clark | |

FOREIGN PATENT DOCUMENTS

CA 2 276 971 A1 1/2001
WO WO 00/13341 A1 3/2000

OTHER PUBLICATIONS

U.S. Appl. No. 12/323,646, filed Nov. 26, 2008, Wang, et al.
Shriram Kulkarni, et al., "A High-speed 32-bit Parallel Correlator for Spread Spectrum Communication", 9th International Conference on VLSI Design, IEEE 1995, pp. 313-315.
Office Action issued Sep. 21, 2011 in Chinese Application No. 200710089734.1 (English Translation).
Zhu Jianchun, et al., "Interleaver Performance Analysis and Simulation for Turbo Coding", Journal of Wuhan University of Technology (Transportation Science & Engineering), vol. 27, No. 2, Apr. 2003, 6 pages (With English Translation).

* cited by examiner

*Primary Examiner* — David C. Payne
*Assistant Examiner* — Adolf Dsouza
(74) *Attorney, Agent, or Firm* — Oblon, Spivak, McClelland, Maier & Neustadt, L.L.P.

(57) ABSTRACT

A method for generating a preamble signal for a wireless communication system including the step of combining a plurality of different short PN sequences into a long PN sequence, wherein one of the plurality of short PN sequences includes information that is configured for coarse timing synchronization, and the long PN sequence includes information that is configured for fine timing synchronization.

28 Claims, 5 Drawing Sheets

| a1 | a2 | a3 | ∘ ∘ ∘ | a29 | a30 | a31 | }29

| b1 | b2 | b3 | ∘ ∘ ∘ | b29 | b30 | b31 | }30

| c1 | c2 | c3 | ∘ ∘ ∘ | c29 | c30 | c31 | }31

| d1 | d2 | d3 | ∘ ∘ ∘ | d29 | d30 | d31 | }32

| a1 | b1 | c1 | d1 | a2 | b2 | c2 | d2 | a3 | b3 | c3 | d3 | ∘ ∘ ∘

Figure 1:
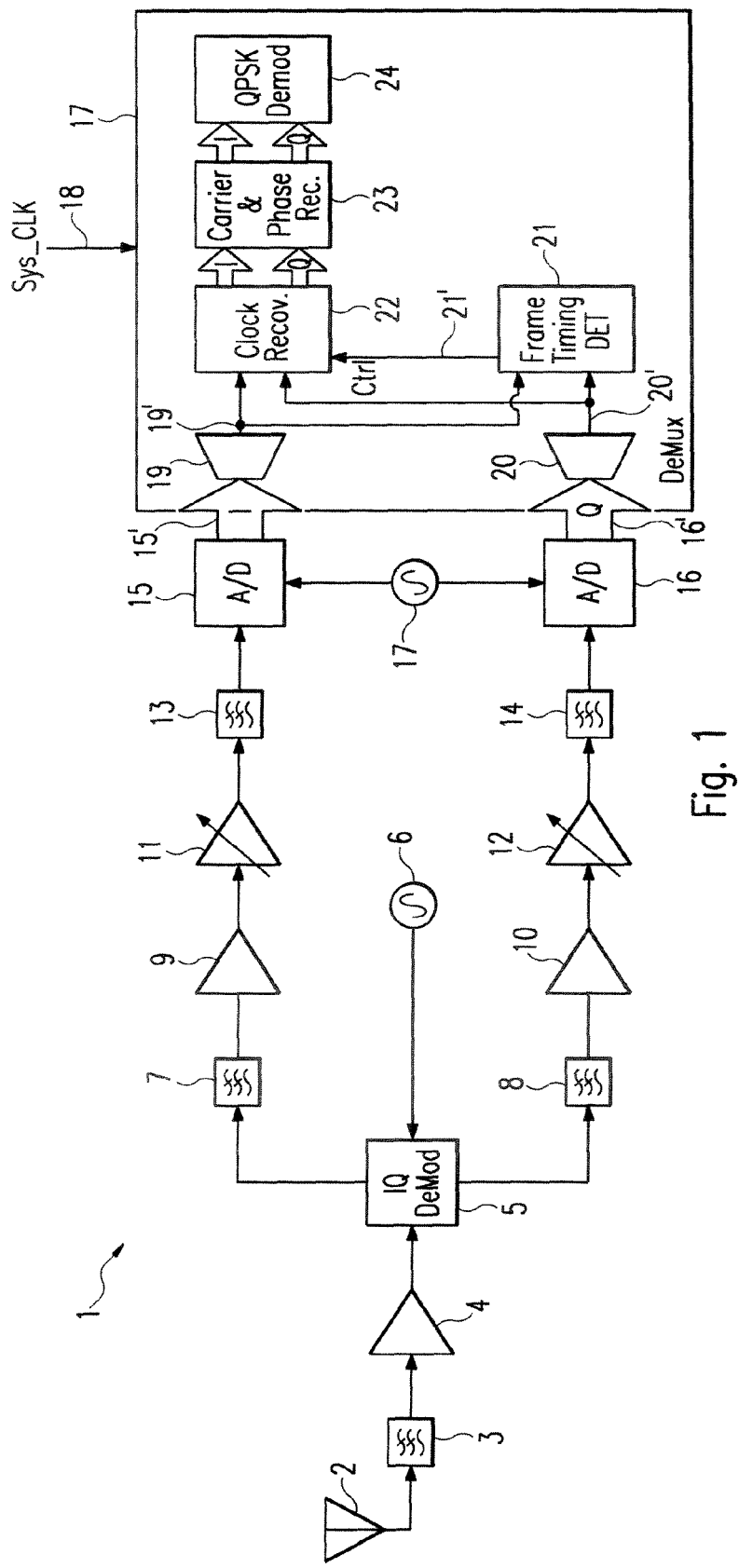

∘ ∘ ∘ | a29 | b29 | c29 | d29 | a30 | b30 | c30 | d30 | a31 | b31 | c31 | d31 | }33

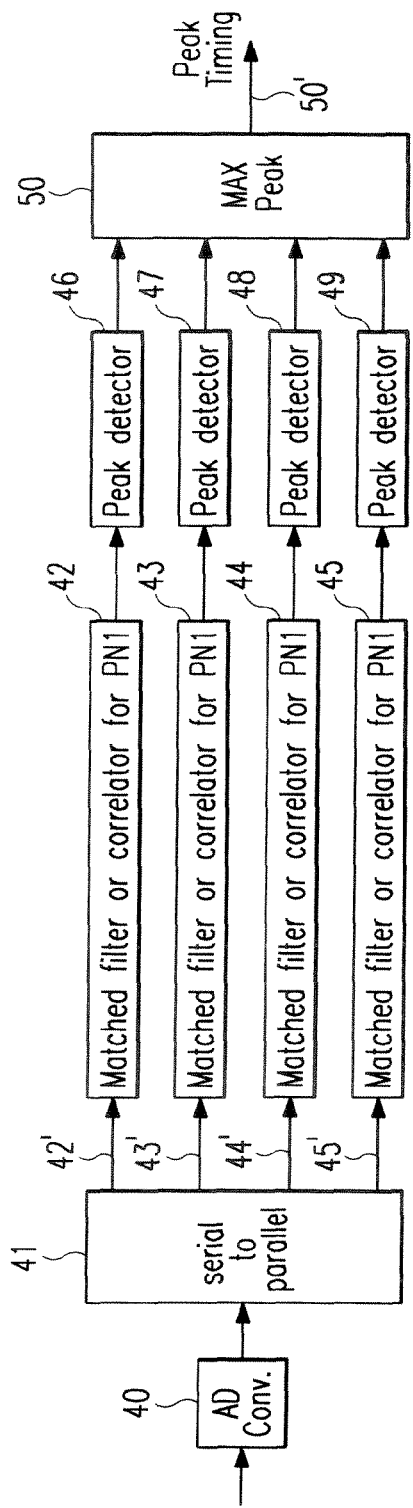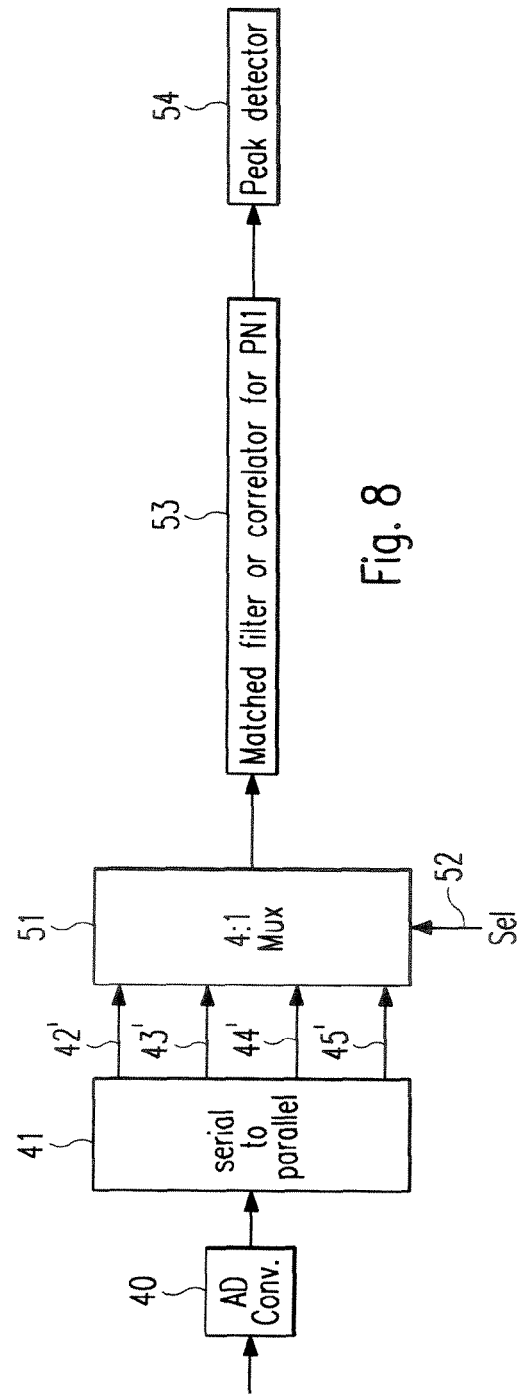

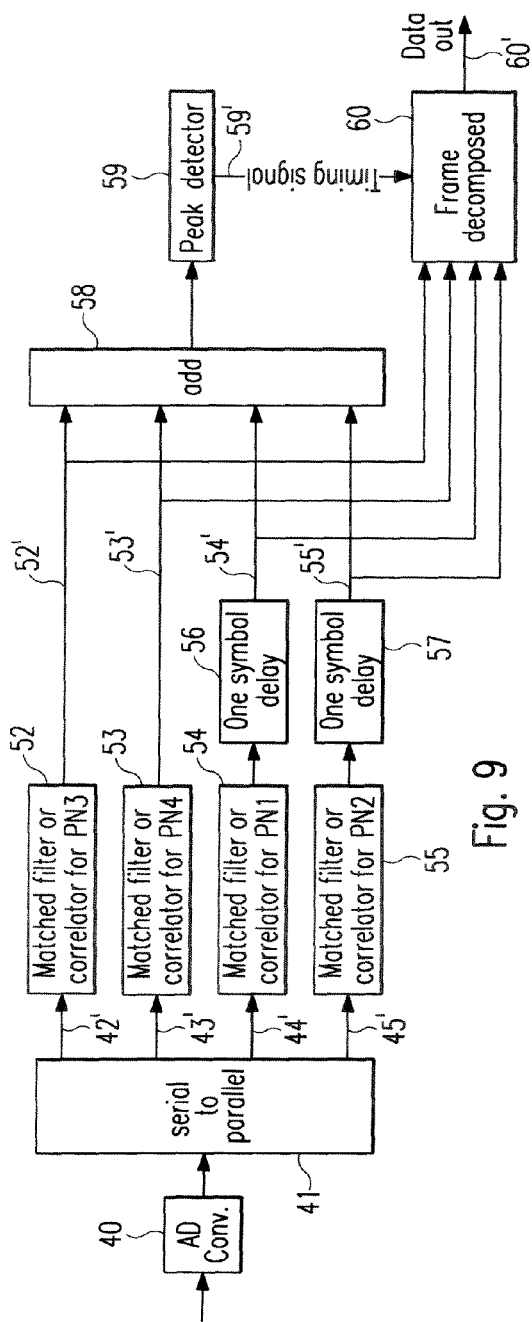
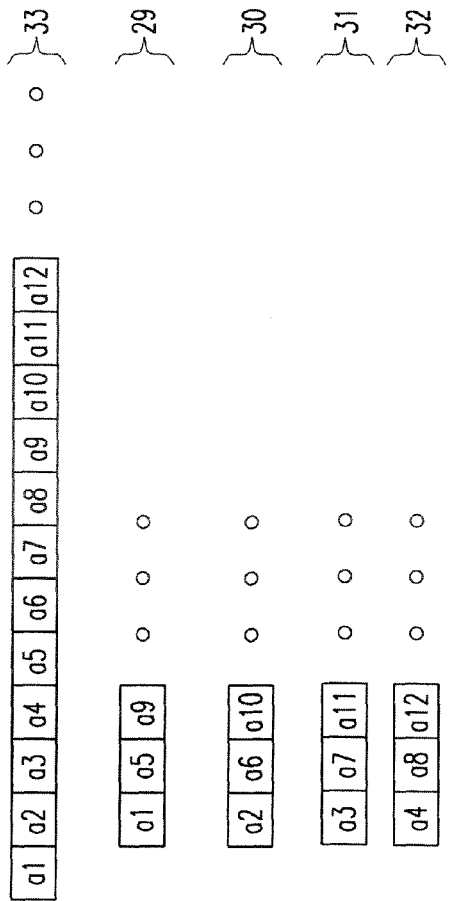
Fig. 9
Fig. 10

PREAMBLE FOR SYNCHRONIZATION

The present invention generally relates to the field of wireless communication, and particularly to a method for generating a preamble signal for a wireless communication system, a synchronization method for a receiver in a wireless communication system, as well as to a transmitter and a receiver adapted thereto.

In wireless communication systems, it is commonly known to use a frame structure including a preamble followed by a data field. While the data field contains the useful data, the preamble is used to obtain accurate frame timing. The preamble usually consists of pseudo-noise (PN) sequences that comprise binary elements of value +1 or −1. The frame timing can be achieved at the receiver side by means of a synchronization or correlation method that correlates the incoming signal and the pre-stored PN sequence.

A correlation method and a corresponding correlator are proposed in the document "A high-speed 32-bit parallel correlator for spread spectrum communication", from Shriram Kulkarni, Pinaki Mazumder and George I. Haddad, IEEE, Ninth International Conference on VLSI design, 1995. The proposed correlator is particularly suited for direct sequence spread spectrum systems that use binary phase shift keying as digital modulation. The bit stream that is received by a receiver is shifted with each clock cycle and correlation is performed between a fixed PN sequence and as many stored bits of the incoming bit stream as the length of the PN sequence. The correlation value between the incoming bit stream and the PN sequence is generated for each clock cycle.

This known parallel correlator has a pipelined structure that is designed to allow parallel processing of the correlator. However, the circuit becomes complex because of the pipelined structure. Therefore the maximum frequency of operation is limited by the multiple stage processing such that said maximum frequency might be not fast enough for the processing of high data rates, especially above 1 Gbps.

In view of the above, it is the object of the invention to provide a simplified correlation technique.

The solution of the invention consists of a new PN sequence being a combination of several short PN sequences, wherein said new PN sequence can be included in a preamble of a communication frame. At least one of said short PN sequences is used by the receiver to perform a first coarse timing synchronization, while the new PN sequence, i.e. the plurality of short PN sequences therein, is used to perform a second fine timing synchronization.

For high data rate wireless communication systems, typically around or above 1 Gbps, the invention allows parallel processing to obtain accurate frame timing and detect the correlation peak of the preamble. The parallel processing allows a reduction of the system clock of baseband in order to reduce the power consumption of the circuit, to avoid the difficulties of high-speed semiconductor chip development and wiring on printed circuit boards.

Furthermore, the receiver of the invention can be simplified because it has only to handle short PN sequences with low rate and low frequency, such that wireless communications with higher data rates can be processed. When using the new preamble or multiple layer preamble of the invention the receiver may have a simple architecture with parallel correlators or parallel matched filters to facilitate the reliable and accurate frame timing for e.g. communication systems beyond 1 Gbps.

Due to the introduction of the new preamble or multiple layer preamble of the invention it is possible to:

Achieve reliable timing for high rate wireless communication systems beyond 1 Gbps, implement a receiver where the parallel correlators or matched filters could be enabled and implemented, reduce the complexity of the parallel circuits of the receiver, improve the processing speed of the receiver, and increase the data rate of the wireless communication.

According to a first aspect of the present invention it is proposed a receiver comprising receiving means for receiving a preamble signal that comprises a long PN sequence being a combination of a plurality of short PN sequences, wherein at least one of said short PN sequences referred to as a coarse timing short PN sequence is adapted to perform a coarse timing synchronization. Extracting means are used and optimized for extracting said coarse timing short PN sequence from said long PN sequence. The receiver comprises further first auto-correlating means for performing a coarse timing synchronization using said coarse timing short PN sequence, and second auto-correlating means for performing a fine timing synchronization using said long PN sequence.

Said extracting means can be adapted to extract said short PN sequences from said long PN sequence, and said second auto-correlation means can be adapted to perform a fine timing synchronization using said short PN sequences.

Said extracting means can be a serial to parallel unit.

Particularly, said long PN sequence can be a combination of M different short PN sequences of length N, wherein M and N are integers greater than 1.

Said long PN sequence can have a binary sequence $S_{long} = \{c_1 c_2 \ldots c_{M*N-1} c_{M*N}\}$, M and N being integers greater than 1, and said extracting means can be adapted to extract from said long PN sequence M short PN sequences of length N having following binary sequences:

$$S_{short,1} = \{c_1 c_{M+1} \ldots c_{M*(N-1)+1}\},$$

$$S_{short,2} = \{c_2 c_{M+2} \ldots c_{M*(N-1)+2}\},$$

$$\ldots,$$

$$S_{short,M} = \{c_M c_{M*2} \ldots c_{M*N}\},$$

The binary sequence $S_{short,1}$ can be used as coarse timing short PN sequence.

Said extracting means can comprise a plurality of parallel outputs connected to one of a plurality of said first auto-correlating means for auto-correlating said coarse timing short PN sequence. Further each of said first auto-correlating means is connected to one of a plurality of peak detectors for peak detection and coarse frame timing.

Said extracting means can comprise a plurality of parallel outputs and said outputs can be connected to a multiplexer for generating a multiplexed signal. Said first auto-correlating means can use said multiplexed signal for auto-correlating said coarse timing short PN sequence. A peak detector can be adapted to perform peak detection and coarse frame timing.

Said second auto-correlating means can be adapted to auto-correlate in parallel each short PN sequence. Further an adder can be adapted to add the auto-correlation results of said second auto-correlation means to determine a fine frame timing.

At least one analog-to-digital converter can be placed before said first and second auto-correlating means.

According to a further aspect of the invention, a mobile terminal of a wireless communication system comprising a receiver according to the above is proposed.

According to a still further aspect of the invention a synchronization method for a receiver in a wireless communication system is proposed. Said method comprises the steps of receiving a preamble signal that comprises a long PN sequence being a combination a plurality of short PN sequences, extracting at least one of said short PN sequence from said long PN sequence for coarse timing synchronization, performing a coarse timing synchronization using said extracted short PN sequence, and performing a fine timing synchronization using said long PN sequence.

According to a further aspect of the invention, there is proposed a method for generating a preamble signal for a wireless communication system. Said preamble signal comprises a long PN sequence that is obtained by combining a plurality of short PN sequences, and at least one of said plurality of short PN sequences is adapted for coarse timing synchronization and said long PN sequence is adapted for fine timing synchronization.

According to a further aspect of the invention, a transmitter of a wireless communication system is provided, said transmitter comprising means designed for implementing a method for generating a preamble signal according to the above.

According to a further aspect of the invention, a preamble signal for timing synchronization in a wireless communication system is provided. Said preamble comprises a long PN sequence being a combination of a plurality of short PN sequences. At least one of said plurality of short PN sequences is used for coarse timing synchronization, and said long PN sequence is used for fine timing synchronization.

It has to be noted that the various elements of the invention which are referred to as 'means' and the corresponding functionality can be implemented with any kind of respective device, unit, soft- or hardware elements and parts thereof as well as any other suitable implementation not explicitly mentioned here.

Figure 2:
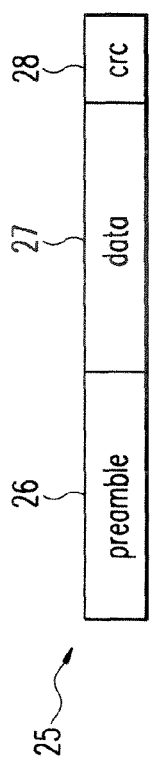
Figures 3, 4:
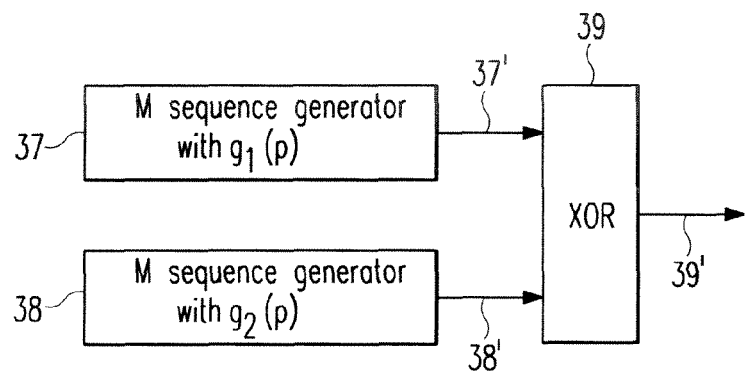
Figure 5:
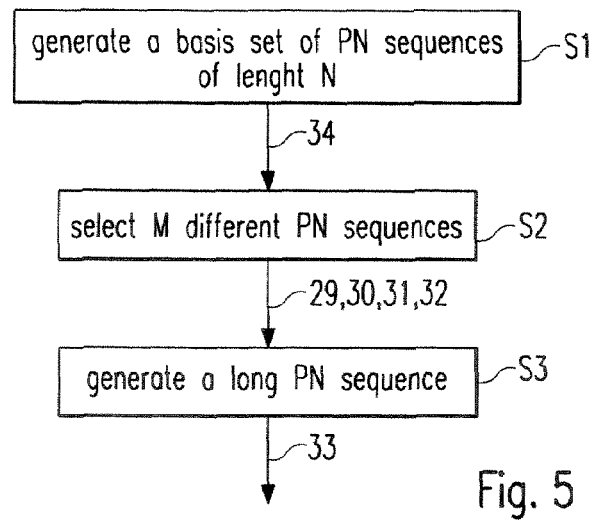
Figure 6:
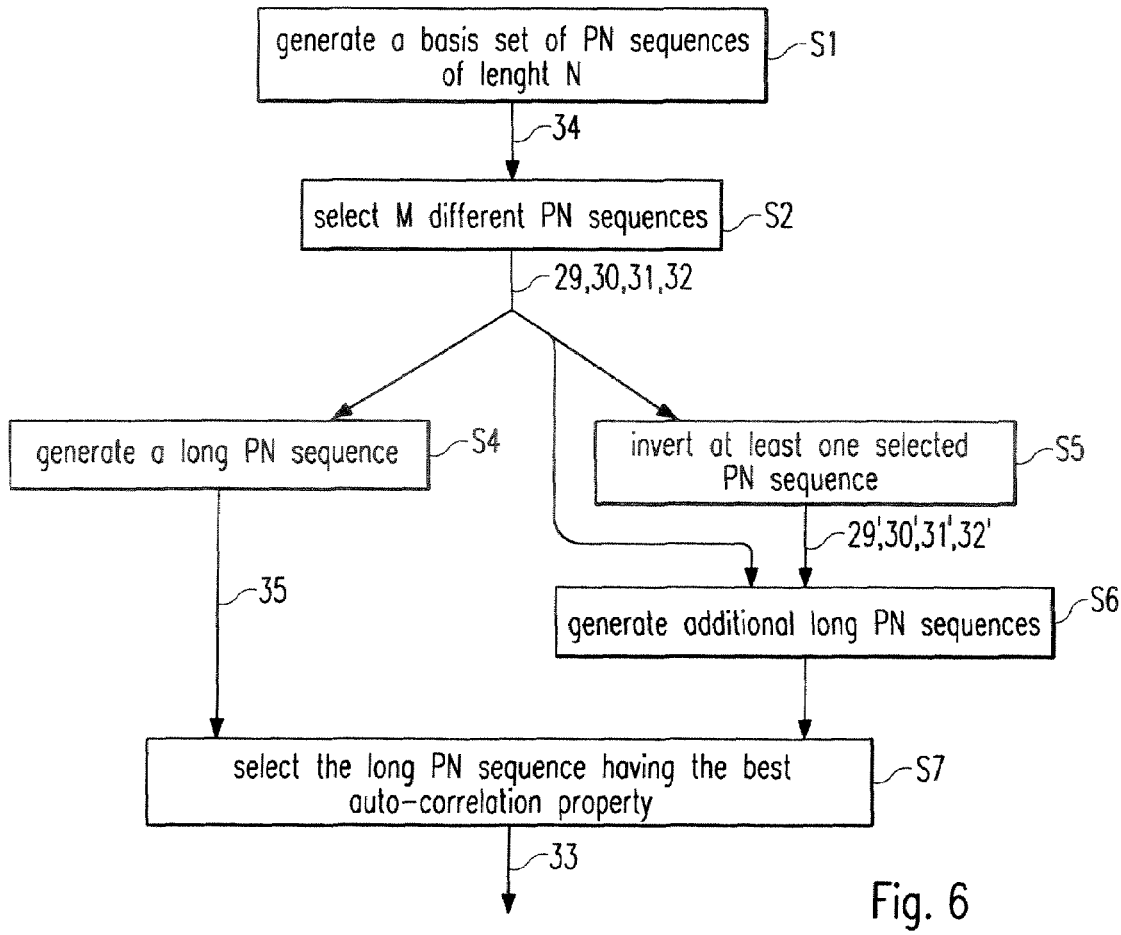

The features, objects, and advantages of the present invention will become more apparent from the detailed description set forth below when taken in conjunction with the drawings in which like reference characters identify correspondingly throughout and wherein:

FIG. 1 is a block diagram of a receiver of a wireless communication system, in accordance with the present invention, FIG. 2 shows the structure of a frame for wireless communication according to the invention, FIG. 3 shows the construction of a pseudo-noise sequence according to the invention, FIG. 4 is a block diagram of a circuit for generating pseudo-noise sequences according to the invention, FIG. 5 shows a method for generating a pseudo-noise sequence and a preamble according to the invention, FIG. 6 shows an alternative method for generating a pseudo-noise sequence and a preamble according to the invention, FIG. 7 is a block diagram of a frame timing detector circuit supporting parallel processing for coarse timing synchronization according to the invention, FIG. 8 is a block diagram of a frame timing detector circuit supporting serial processing for coarse timing synchronization according to the invention, FIG. 9 is a block diagram of a frame timing detector circuit supporting parallel processing for fine timing synchronization according to the invention, FIG. 10 shows the segmentation of a pseudo-noise sequence according to the present invention.

A receiver of a wireless communication system according to the present invention will now be described with reference to FIG. 1. A signal containing data and transmitted wirelessly by a transmitter of a wireless communication system is received by a receiver 1 by means of an antenna 2. Said antenna 2 is able to receive signals at different frequencies and different frequency ranges. The signals said antenna 2 is adapted to receive are preferably high frequency signals and most preferably signals above 1 GHz. According to a particular embodiment of the invention, the antenna 2 is able to receive incoming wireless signals that range from 54 GHz to 64 GHz.

The incoming signal received by said antenna 2 is filtered by a front-end bandpass filter 3 that serves to remove out-of-band signal energy as well as partially reject image band signals. After this filtering, the received signal is amplified by a low-noise amplifier (LNA) 4. The signal on the output of said LNA 4 is a pass-band signal, which frequency is down-converted to the base-band and demodulated by an in-phase/quadrature (IQ) mixer 5 and a first local oscillator 6. The output of the LNA 4 is first multiplied or mixed with the output of the first local oscillator 6 by the IQ mixer 5 to obtain a base-band signal. Then the base-band signal is demodulated such that the two outputs of the IQ mixer 5 correspond to the in-phase component and to the quadrature component of the signal.

Each of the in-phase and quadrature components is supplied to a first low-pass filter 7, 8, a first amplifier 9, 10, a second variable-gain amplifier 11, 12, a second low-pass filter 13, 14, and to an analog-to-digital (AD) converter 15, 16. The AD converters 15, 16 convert the analog in-phase and quadrature components of the signal to corresponding in-phase and quadrature digital data streams 15', 16'. The sampling rate of the data streams 15', 16' is defined by a second local oscillator 17, which outputs to the AD converters 15, 16 a clock signal at the sampling frequency.

The digital data streams 15', 16' are sent to and processed by a digital signal processor (DSP) unit 17. Said DSP unit 17 has three inputs for the two data streams 15', 16' and for a system clock signal 18 of the DSP unit 17. The data streams 15', 16' are supplied to demultiplexers 19, 20 of the DSP unit 17 for breaking each of the data streams 15', 16' into a plurality of lower data rate streams or demultiplexed streams 19', 20'. Each demultiplexer 19, 20 preferably generates M different parallel demultiplexed streams 19', 20' that can be noted $19'_1$ to $19'_M$ and $20'_1$ to $20'_M$ respectively.

Said DSP unit 17 further comprises a frame timing unit 21 according to the present invention, a clock recovery unit 22, a carrier and phase recovery unit 23, and a demodulation unit 24. Said frame timing unit 21 uses the demultiplexed streams 19', 20' to produce a control signal 21' for a timing synchronization of said demultiplexed streams 19', 20'. The control signal 21' is passed to said clock recovery unit 22 for synchronizing and accurately recovering the clock of the data streams 15', 16'. Once the synchronization is achieved, it is possible to recover the carrier as well as the phase of the data streams 15', 16' by means of said carrier and phase recovery unit 23. Then said demodulation unit 24 is responsible for the demodulation, which may be a QPSK demodulation.

The wireless communication system further comprises a transmitter (not shown) for transmitting wirelessly a signal to the receiver 1. The transmitter comprises a multiplexer for multiplexing or combining a plurality of data streams to be transmitted into a data stream of higher data rate, a modulator for modulating or symbol mapping a data stream, and an antenna for transmitting a signal containing the modulated data.

FIG. 2 shows the frame structure of a signal sent wirelessly by said transmitter and received wirelessly by said receiver 1.

The signal comprises a succession of frames 25 that contain data or useful data 27. In addition to said data 27, a frame 25 also comprises a preamble 26 that provides synchronization information to be used by the receiver 1. In fact the receiver 1 receives the frame 25 and acquire frame synchronization and frequency synchronization on the basis of the time domain preamble 26 contained in the frame 25. The preamble 26 comprises one or a plurality of pseudo-noise (PN) sequences. Said PN sequences are well-known sequences of binary elements or so-called chips taking the value +1 or −1. A PN sequence in fact contains a deterministic sequence of chips and produces a signal similar to noise when modulated on a carrier.

Preferably the frame 25 also comprises a cyclic redundancy check (CRC) field 28 following said preamble 26 and said data 27. The CRC field 28 may be used to generate a checksum for detecting and/or even correcting errors caused by noise in transmission channels. The CRC is computed and appended to the frame by the transmitter before transmission, and verified afterwards by the receiver 1 to confirm that the data 27 has not been modified or corrupted during transmission.

With reference to FIGS. 3 to 6 the construction of the preamble 26 of the invention for parallel processing of said demultiplexed streams 19', 20' will be described in the following. The algorithm of construction of the preamble 26 is implemented in the transmitter for generating the preamble 26, and in the receiver 1 for generating a local reference of said preamble 26 such that a correlation of the received data stream with said local reference can be done.

The preamble 26 according to the present invention comprises a first or long PN sequence 33 being a combination of a plurality of M second or short PN sequences 29, 30, 31, 32, see FIG. 3. Each short PN sequence 29 to 32 has preferably a length N such that the long PN sequence 33 has a number of M*N chips. The method of generating the preamble 26 comprises the generation of said long PN sequence 33 and the generation of said short PN sequences 29 to 32.

Such a generation method is shown in FIG. 5. In a first step, a first or basis set of sequences of length N, referred to by the reference 34, is generated (S1). This basis set of sequences 34 may e.g. consist in the whole set of M sequences, Gold or Kasami sequences of length N. M sequences, also referred to as maximal-length sequences or maximal-length codes, as well as Gold sequences and Kasami sequences are well-known state of the art PN sequences. A description of said state of the art PN sequences can be found at the web site "http://en.wikipedia.org" or in the lecture notes of Prof. Tapani Ristaniemi about spread spectrum techniques available at the web address "http://www.cs.tut.fi/kurssit/TLT-5606/lect2.pdf".

In a second step, M different short PN sequences 29 to 32 are selected (S2) from among said basis set of sequences 34. A short PN sequence 29 to 32 that is selected from the basis set of sequences 34 has to satisfy following requirements:

The auto-correlation value of a selected short PN sequence 29 to 32 is good compared to non-selected short PN sequences. Preferably, the auto-correlation of a selected short PN sequence 29 to 32 is better than that of a non-selected short PN sequence. In addition thereto, the size of the off-peak values of a selected short PN sequence 29 to 32 is small, and preferably below a given threshold.

The cross-correlation value of a selected short PN sequence 29 to 32 is optimized to a low level. Preferably, the cross-correlation of a first selected short PN sequence with a second selected short PN sequence is smaller than the cross-correlation of said first selected short PN sequence with a non-selected short PN sequence. In order to achieve this requirement, a computer search can be carried out among the basis set of sequences 34 to find out the short PN sequences presenting the best, i.e. smallest, cross-correlation values.

In an alternative second step, the selected short PN sequences 29 to 32 are any different PN sequences of length N that are comprised in a basis set of sequences of length N. This basis set of sequences may e.g. consist in the whole set of M sequences, Gold or Kasami sequences of length N:

In a third step, the M short PN sequences 29 to 32 that have been selected are concatenated or multiplexed (S3) into said long PN sequence 33 of length M*N. FIG. 3 shows an example of concatenation for obtaining the long PN sequence 33. In the embodiment of FIG. 3, four short PN sequences 29 to 32 of length 31 have been selected according to the above described first and second steps. A first short PN sequence 29 comprises thus a number of 31 chips noted a1, a2, . . . , a31. A second, a third and a fourth short PN sequences 30, 31, 32 comprises a number of 31 chips noted respectively b1 to b31, c1 to c31, and d1 to d31.

According to the embodiment of FIG. 3, the long PN sequence 33 is obtained by combining sequentially one chip of each short PN sequence 29 to 32. The chip structure of the long PN sequence 33 is the following: a1, b1, c1, d1, a2, b2, c2, d2, a3, b3, c3, d3, . . . , $a_{N-1}$, $b_{N-1}$, $C_{N-1}$, $d_{N-1}$, $a_N$, $b_N$, $c_N$, $d_N$.

The long PN sequence 33 is generated by multiplexing or interleaving the short PN sequences 29 to 32. This can be done either by a computing means or by a multiplexer or interleaver that is complementary to the demultiplexers 19, 20 of the receiver 1. Preferably, the transmitter comprises such a complementary multiplexer for generating the preamble 26 of the signal frame 25 to be transmitted.

FIG. 6 shows an alternative method of generating the short and long PN sequences 29 to 33. According to the method of FIG. 6, a basis set 34 of PN sequences of length N is generated (S1) and M different PN sequences 29 to 32 are selected (S2) as for the method of FIG. 5.

In a next step, a first long PN sequence 35 is generated (S4) by multiplexing said M different PN sequences 29 to 32. In parallel thereto, at least one of the short PN sequences 29, 32 is inverted (S5), i.e. the sign of all chips of at least one of the short PN sequences 29, 32 is changed, to obtain new sets of M short PN sequences 29' to 32'. Then second long PN sequences 36 are generated (S6) by multiplexing at least one inverted short PN sequence 29' to 32' and the remaining of non-inverted short PN sequences 29 to 32 according to the same multiplexing scheme as for obtaining said first long PN sequence 35.

From among the first long PN sequence 35 and the at least one second long PN sequence 36, it is then proposed to choose (S7) the sequence having a good and preferably the best auto-correlation value and/or cross-correlation value for building the long PN sequence 33 of the preamble 26. This means that the maximum of all off-peak values is minimized.

If further long PN sequences are needed, the last step (S7) can be carried out again for selecting further long PN sequences having good or preferably best auto-correlation and/or cross-correlation properties.

FIG. 4 shows a method of generating the different short PN sequences 29, 32 utilizing Gold sequences. According to the invention, the synchronization at the receiver 1 comprises two steps: a coarse timing synchronization based on the correlation of one of the short PN sequences 29 to 32 referred to as coarse short PN sequence or main short PN sequence PN1, and a fine timing synchronization based on the correlation of the whole long PN sequence 33 i.e. all short PN sequences 29 to 32. Said main short PN sequence PN1 used for the coarse timing synchronization is chosen from among the short PN sequences 29 to 32 by the receiver 1 as having the best auto-correlation and cross-correlation properties.

With reference to FIG. 4 it will now be described a method for choosing said main short PN sequence PN1. A first sequence generator 37 generates a first M sequence 37' and a second sequence generator 38 generates a second M sequence 38'. As an example, the generator polynomial of said first M sequence 37' can be $$g_1(p)=p^5+p^2+1$$

and the generator polynomial of said second M sequence 38' can be $$g_2(p)=p^5+p^4+p^2+p+1$$

The generator polynomials of the first M sequence 37' and the second M sequence 38' have thereby to be different. In this example, both first M sequence 37' and second M sequence 38' have a length of 31 chips.

An XOR unit 39 is provided together with said first sequence generator 37 and a second sequence generator 38. The first M sequence 37' and the second M sequence 38' are supplied to inputs of the XOR unit 39, which XOR function generates 31 different Gold sequences 39' corresponding to the 31 relative phases of the two M sequences 37', 38'.

Preferably, the first M sequence 37' is chosen as main short PN sequence PN1 for performing the coarse timing synchronization. The remaining short PN sequences referred to as PN2, PN3 and PN4 that are used for coarse timing synchronization are chosen from among the set of sequences 39' generated by the XOR unit 39. In an embodiment of the present invention where four short PN sequences 29, 32 are used, the main short PN sequence PN1 thus corresponds to one of the inputs of the XOR unit 39, while the three other short PN sequences PN2, PN3, PN4 are chosen among the outputs of the XOR unit 39. As a result, when the correlation of the main short PN sequence PN1 reaches a peak, the cross-correlation between PN1 and PN2, PN1 and PN3, PN1 and PN4 are negligible.

With reference to FIG. 10 it will now be described how the long PN sequence 33 is segmented or demultiplexed to obtain said short PN sequences 29 to 32. This demultiplexing method is particularly performed by the receiver 1 upon reception of a frame 25. The receiver 1 receives the frame 25 that comprises the long PN sequence 33 at a given rate, and the demultiplexers 19, 20 split up said long PN sequence 33 into M parallel short PN sequences 29 to 32 at a lower rate that the given rate of the long PN sequence 33 for parallel synchronization processing.

According to the embodiment shown if FIG. 10, the long PN sequence 33 of length M*N has the chip structure a1, a2, a3, . . . , $a_{M*N-1}$, $a_{M*N}$. Each M-th chip is assigned to another parallel line by the demultiplexers 19, 20. When the demultiplexed signal is the long PN sequence 33 and for M=4, the following four short PN sequences 29 to 32 are constructed:

PN1=a1,a5,a9, . . . , $a_{M*N-3}$

PN2=a2,a6,a10, . . . , $a_{M*N-2}$

PN3=a3,a7,a11, . . . , $a_{M*N-1}$

PN4=a4,a8,a12, . . . , $a_{M*N}$

With reference to the circuits of FIGS. 7 to 9, it will now be described how the coarse and fine timing synchronization is performed by the receiver 1 according to the invention. As stated above, the short PN sequences 29 to 32 comprise said main short PN sequence PN1 for coarse timing synchronization. On the other hand fine timing synchronization is achieved by correlating all short PN sequences 29 to 32.

As shown in FIG. 7, the signal received by the receiver 1 is sampled by an AD converter 40. The sampled signal is then passed through an serial to parallel unit 41, which may e.g. be a demultiplexer or a deinterleaver, for generating a plurality of parallel demultiplexed signals 42', 43', 44', 45'. In the particular embodiment of FIG. 7, the serial to parallel unit 41 generates four demultiplexed signals 42' to 45'. Each of said demultiplexed signals 42' to 45' is then sent to a matched filter or correlator 42, 43, 44, 45 that correlates the incoming demultiplexed signal 42' to 45' with the main short PN sequence PN1 that has been chosen for coarse timing synchronization. Each matched filter 42 to 45 generates a cross-correlation signal from one of the demultiplexed signals 42' to 45' and the main short PN sequence PN1.

A plurality of peak detectors 46, 47, 48, 49 receives the correlation results of said matched filters 42 to 45 and sends the peak results to a max peak unit 50. Only the matched filter 42 to 45 that receives a signal aligned with or corresponding to the main short PN sequence PN1 will output a sharp peak because of the peak of the auto-correlation function of said main short PN sequence PN1. In contrast thereto, the other matched filters 42 to 45 will output a small value or peak. The max peak unit 50 generates a peak timing signal 50' if it receives a signal from the peak detectors 46 to 49 that is above a predetermined threshold level. The peak timing signal 50' can thus be used by the receiver 1 to achieve a coarse timing synchronization as said peak timing signal 50' is only generated when the main short PN sequence PN1 is contained in the demultiplexed signals 42' to 45'.

FIG. 8 shows an alternative circuit for determining the coarse timing synchronization. After the received signal is sampled by the AD converter 40 and demultiplexed by the serial to parallel unit 41, the obtained parallel signals 42' to 45' are multiplexed by a multiplexer 51. The signal of the multiplexer 51 is applied to the matched filter or correlator 53 performing a correlation with the main short PN sequence PN1. A peak detector 54 then generates a peak timing signal 50' on the basis of a peak detected in the correlation signal. In the embodiment of FIG. 8, the multiplexer 51 is a 4:1 multiplexer controlled by a selection signal 52 that can be steered from 0 to 3 to select the different parallel signals 42' to 45'.

FIG. 9 shows a circuit for fine timing synchronization that may be part of the receiver 1. After coarse timing synchronization, the time position is recorded and a fine timing synchronization is performed by, at first, generating said parallel demultiplexed signals 42' to 45'. The obtained demultiplexed signals 42' to 45' are fed to matched filters or correlators 52, 53, 54, 55 for correlating each parallel signal 42' to 45' with a different short PN sequence 29 to 32.

The one demultiplexed signal 44', into which a peak has been detected during the coarse timing synchronization step, is correlated with the main short PN sequence PN1, and the remaining demultiplexed signal 42', 43', 45' are correlated with the remaining short PN sequences PN2, PN3, PN4. In order to align the timing between the different outputs 42' to 45' of the serial to parallel unit 41, delay units 56, 57 operating a one symbol or one chip delay may be placed after some correlators 52 to 55.

The eventually delayed outputs 52', 53', 54', 55' of the different correlators 52 to 55 are added by an adder 58 and then supplied to a peak detector 59 that generates a timing signal 59' when a peak is indeed detected. This timing signal 59' controls a multiplexer 60 that generates data 60' from the eventually delayed outputs 52' to 55' of the different correlators 52 to 55.

In the following it will be described how the receiver 1 performs an auto-correlation for the timing synchronization according to the present invention.

At the receiver 1, the incoming data stream formatted by the transmitter according to the frame structure 25 is synchronized by performing an auto-correlation of at least one of the short PN sequences 29-32 extracted from the preamble 26. In fact when the receiver 1 receives the preamble 26 containing said long PN sequence 33, said long PN sequence 33 is passed to the demultiplexers 19, 20 that in turn generates the plurality of short PN sequences 29 to 32.

The auto-correlation process carried out by the receiver 1 involves the use of a correlator circuit for correlating the received and demultiplexed signal 42' to 45' with a local reference chip sequence of the short PN sequence 29 to 32 to auto-correlate. This local reference chip sequence can be obtained according to the method for generating short PN sequences presented above with reference to FIGS. 3 to 6 and 10. More particularly, the received binary values or chips are entered into a shift register and for each chip time period, the received chips are shifted one position in the shift register. At each chip time period, the number of matches between the local reference sequence and the received chips in the shift register is obtained.

In a noise free system, the auto-correlation and thus the synchronization is indicated by a total match between the received chips in the shift register and the reference sequence. In real systems noise prevents all the chips from being correctly received such that synchronization decisions are based on whether the number of matches is above an upper predetermined threshold. Alternatively, peak detection can be used instead of the upper threshold. When peak detection is used, the synchronization is very accurate because the decision is dependent on a maximum of matches between the received signal in the shift register and the local reference of the short PN sequence 29 to 32.

The invention claimed is:

1. A method for generating a preamble signal for a wireless communication system, comprising:
    combining a plurality of different short PN sequences having the same length into a long PN sequence,
    wherein at least one of said different short PN sequences being a coarse timing short PN sequence and includes information that is configured to perform coarse timing synchronization,
    wherein said long PN sequence includes information that is configured to perform fine timing synchronization based on a correlation of the long PN sequence and all of the plurality of different short PN sequences, and
    wherein the coarse timing short PN sequence is selected from a set of M sequences, the M sequences being a set of different Gold sequences or different Kasami sequences each having the same length N, N being the length of a short PN sequence.

2. The method according to claim 1, further comprising:
    selecting M different short PN sequences having a length N, and
    combining said M different short PN sequences or the opposite thereof for obtaining said long PN sequence having the length M*N.

3. The method according to claim 1, wherein
    M different short PN sequences having a respective binary sequence $S'_{short,i} = \{b_{i,1}\ b_{i,2}\ \ldots\ b_{i,N}\}$, i being comprised between 1 and M, are selected, and the binary sequence $S_{long}$ of the long PN sequence is constructed as follows:

$S'_{long} = \{b_{1,1}\ b_{2,1}\ \ldots\ b_{M,1}$ $b_{1,2}\ b_{2,2}\ \ldots\ b_{M,2}\ \ldots$ $\ldots$ $b_{1,N}\ b_{2,N}\ \ldots\ b_{M,N}\}$.

4. The method according to claim 3, further comprising:
    constructing at least one additional long PN sequence $S'_{long,add}$ by changing the sign of at least one short PN sequence, and
    among the constructed long PN sequences $S'_{long}$ and $S'_{long,add}$, selecting the one having a best auto-correlation property and including the selected long PN sequence in said preamble signal.

5. The method according to claim 3,
    wherein the binary sequence $S'_{short,1} = \{b_{1,1},\ b_{1,2}\ \ldots\ b_{1,N}\}$ is allocated to the short PN sequence that is configured for coarse timing synchronization.

6. The method according to claim 1,
    wherein said short PN sequences are selected on the basis of one of an auto-correlation property or cross-correlation property.

7. The method according to claim 1,
    wherein the coarse timing short PN sequence that is configured for coarse timing synchronization is the sequence that has the best auto-correlation and cross-correlation properties among the plurality of short PN sequences included in said long PN sequence.

8. The transmitter of a wireless communication system comprising means designed for implementing a method for generating a preamble signal according to claim 1.

9. The method according to claim 1, wherein none of the different Gold sequences or different Kasami sequences are repeated in the preamble signal.

10. A receiver, comprising:
    receiving means for receiving a preamble signal that includes a long PN sequence being a combination of a plurality of different short PN sequences having the same length, wherein the plurality of different short PN sequences are selected from a set of M sequences, the M sequences being a set of different Gold sequences or different Kasami sequences each having the same length N, N being the length of each short PN sequence, at least one of said different short PN sequences referred to as a coarse timing short PN sequence is configured to perform a coarse timing synchronization,
    extracting means for extracting said coarse timing short PN sequence from said long PN sequence,
    first auto-correlating means for performing a coarse timing synchronization using said coarse timing short PN sequence, and
    second auto-correlating means for performing a fine timing synchronization using said long PN sequence.

11. The receiver according to claim 10, wherein
    said extracting means is further configured to extract said short PN sequences from said long PN sequence, and
    said second auto-correlation means is further configured to perform a fine timing synchronization using said short PN sequences.

12. The receiver according to claim 10, wherein
    said extracting means is a serial to parallel unit.

13. The receiver according to claim 10, wherein
said long PN sequence is a combination of M different short PN sequences of length N, wherein M and N are integers greater than 1.

14. The receiver according to claim 10, wherein
said long PN sequence has a binary sequence $S_{long} = \{c_1 \, c_2 \ldots c_{M*N-1} \, c_{M*N}\}$, M and N being integers greater than 1, and
said extracting means is configured to extract from said long PN sequence M short PN sequences of length N having following binary sequences:

$S_{short,1} = \{c_1 \, c_{M+1} \ldots c_{M*(N-1)+1}\}$, $S_{short,2} = \{c_2 \, c_{M+2} \ldots c_{M*(N-1)+2}\}$, $\ldots$, $S_{short,M} = \{c_M \, c_{M*2} \ldots c_{M*N}\}$.

15. The receiver according to claim 14, wherein
the binary sequence $S_{short,1}$ is used as coarse timing short PN sequence.

16. The receiver according to claim 10, wherein
said extracting means comprises a plurality of parallel outputs,
each of said outputs is connected to one of a plurality of said first auto-correlating means for auto-correlating said coarse timing short PN sequence, and
each of said first auto-correlating means is connected to one of a plurality of peak detectors for peak detection and coarse frame timing.

17. The receiver according to claim 10, wherein
said extracting means comprises a plurality of parallel outputs,
said outputs are connected to a multiplexer for generating a multiplexed signal,
said first auto-correlating means uses said multiplexed signal for auto-correlating said coarse timing short PN sequence, and the receiver further comprises,
a peak detector configured to perform peak detection and coarse frame timing.

18. The receiver according to claim 10, wherein
said second auto-correlating means is configured to auto-correlate in parallel each short PN sequence, and the receiver further comprises,
an adder configured to add the auto-correlation results of said second auto-correlation means to determine a fine frame timing.

19. The receiver according to claim 10, further comprising:
at least one analog-to-digital converter that is placed before said first and second auto-correlating means.

20. A mobile terminal of a wireless communication system comprising a receiver according to claim 10.

21. The receiver according to claim 10, wherein none of the different Gold sequences or different Kasami sequences are repeated in the preamble signal.

22. A synchronization method for a receiver in a wireless communication system, comprising the steps of:
receiving by the receiver a preamble signal that includes a long PN sequence comprising a combination a plurality of different short PN sequences,
extracting at least one of said plurality of different short PN sequences having the same length from said long PN sequence for coarse timing synchronization, the plurality of different short PN sequences are selected from a set of M sequences, the M sequences being a set of different Gold sequences or different Kasami sequences each having the same length N, N being the length of each short PN sequence,
performing a coarse timing synchronization using said extracted short PN sequence, and
performing a fine timing synchronization using said long PN sequence.

23. The method according to claim 22, further comprising:
receiving a long PN sequence having the following binary sequence: $S_{long} = \{c_1 \, c_2 \ldots c_{M*N}\}$, with M and N being integers greater than 1, and
extracting the following M short PN sequences of length N from said long PN sequence $S_{short,1} = \{c_1 \, c_{M+1} \ldots c_{M*(N-1)+1}\}$, $S_{short,2} = \{c_2 \, c_{M+2} \ldots c_{M*(N-1)+2}\}$, $\ldots$, $S_{short,M} = \{c_M \, c_{M*2} \ldots c_{M*N}\}$.

24. The method according to claim 23,
wherein the short PN sequence $S_{short,1}$ is used for coarse timing synchronization.

25. The method according to claim 22, further comprising:
receiving a binary data stream,
demultiplexing said binary data stream into M parallel binary data streams,
correlating in parallel said short PN sequence for coarse timing synchronization with each parallel binary data stream, and
comparing the correlation results with a predefined threshold to determine a coarse frame timing.

26. The method according to claim 22, further comprising:
receiving a binary data stream,
demultiplexing said binary data stream into M parallel binary data streams,
multiplexing said parallel binary data streams according to the length N of a short PN sequence,
correlating said short PN sequence for coarse timing synchronization with the multiplexed binary data stream, and
comparing the correlation result with a predefined threshold to determine a coarse frame timing.

27. The method according to claim 22, further comprising:
receiving a binary data stream,
demultiplexing said binary data stream into M parallel binary data streams,
correlating in parallel each short PN sequence with a different parallel binary data stream, and
adding the M correlation values to determine a fine frame timing.

28. The method according to claim 22, wherein none of the different Gold sequences or different Kasami sequences are repeated in the preamble signal.

* * * * *